United States Patent
Yun

(10) Patent No.: US 7,603,691 B2
(45) Date of Patent: *Oct. 13, 2009

(54) OPEN CABLE SET-TOP BOX DIAGNOSING SYSTEM AND METHOD THEREOF

(75) Inventor: Hwa Young Yun, Seoul (KR)

(73) Assignee: LG Electronic, Inc., Seoul (KR)

( * ) Notice: Subject to any disclaimer, the term of this patent is extended or adjusted under 35 U.S.C. 154(b) by 769 days.

This patent is subject to a terminal disclaimer.

(21) Appl. No.: 10/919,230

(22) Filed: Aug. 17, 2004

(65) Prior Publication Data

US 2005/0149980 A1 Jul. 7, 2005

Related U.S. Application Data

(63) Continuation of application No. 09/758,417, filed on Jan. 12, 2001, now Pat. No. 6,915,531.

(30) Foreign Application Priority Data

Jan. 13, 2000 (KR) .................................. 2000/1569

(51) Int. Cl.
*H04N 7/173* (2006.01)

(52) U.S. Cl. .................. 725/107; 725/132; 714/27; 714/47; 702/188

(58) Field of Classification Search ................ 725/107, 725/152, 140, 132; 714/27, 47; 702/188
See application file for complete search history.

(56) References Cited

U.S. PATENT DOCUMENTS

| 4,156,847 A | * | 5/1979 | Tazawa et al. | 725/107 |
| 4,912,552 A | * | 3/1990 | Allison et al. | 725/21 |
| 5,548,323 A | * | 8/1996 | Callahan | 725/33 |
| 5,973,684 A | | 10/1999 | Brooks et al. | |
| 6,081,533 A | | 6/2000 | Laubach et al. | |
| 6,754,908 B1 | * | 6/2004 | Medvinsky | 725/107 |

* cited by examiner

*Primary Examiner*—James Sheleheda
(74) *Attorney, Agent, or Firm*—Birch, Stewart, Kolasch & Birch, LLP

(57) ABSTRACT

An open cable set-top box diagnosing system in which a point of deployment (POD), separated from a main circuit unit, having a newly defined interface is used to check an operation state of an open cable set-top box, transmits the checked state to a predetermined server, according to which the operation state of the open cable set-top box is diagnosed. The open cable set-top box diagnosing system includes an open cable set-top box for checking its own operation state by using a diagnosis resource by a communication protocol between a point of deployment (POD) separated from the main circuit unit and the main circuit, and a head end for providing a service corresponding to a request signal received from the open cable set-top box or providing a broadcast program to the open cable set-top box, and checking the operation state of the open cable set-top box.

6 Claims, 9 Drawing Sheets

FIG.5

| Syntax | NO. OF BITS |
|---|---|
| Diag_open_req() {<br>    Diag_open_req_tag<br>    Length_field( ) = 0<br>} | 24 |

FIG.6A

| Syntax | NO. OF BITS | DESCRIPTION |
|---|---|---|
| Diag_open_cnf( ) {  | | |
|     Diag_open_cnf_tag | 24 | |
|     Length_field() | | |
|     Send_datatype_number | 8 | |
|     For(I=0; I<Send_datatype_number;I++) { | 8 | INFORMATION REPLY TO SET-TOP BOX AND MANUFACTURER |
|         Datatype_ID | | |
|         Datatype_length | 8 | |
|         For(J=0; J<Datatype_length; J++) { | | |
|             Data_byte | 8 | |
|         } | | |
|     } | | NUMBER OF SUBSYSTEM INCLUDING SET-TOP BOX |
|     Sub_system_number | 8 | |
|     For(I=0;Sub_system_number;I++) { | | |
|         Sub_sustem_id | 8 | |
|     } | | LIST OF SUBSYSTEM |
| } | | |

FIG.6B

| Datatype_id | id VALUE | LENGTH (BYTES) |
|---|---|---|
| Manufacturer_id | 0x01 | 50(Max) |
| Brand_id | 0x02 | 50(Max) |
| Model_id | 0x03 | 20(Max) |
| Serial_id | 0x04 | 20(Max) |
| Host_id | 0x05 | 8 |
| POD_module_id | 0x06 | 8 |

FIG.6C

| Sub_system | id VALUE(HEXA) |
|---|---|
| CableNIM tuning sub_system | 0x01 |
| TP demultiplexing sub_system | 0x02 |
| Video decoding sub_system | 0x03 |
| Audio decoding sub_system | 0x04 |
| Graphics sub_system | 0x05 |
| Copy protection sub_system | 0x06 |

FIG.7

| Syntax | NO. OF BITS |
|---|---|
| Diag_stat_req() {<br>    Diag_stat_req_tag<br>    Length_field( ) = 0<br>} | 24 |

FIG.8

| Syntax | NO. OF BITS | DESCRIPTION |
|---|---|---|
| Diag_stat_cnf() {          Diag_stat_cnf_tag          Length_field( )          System_status } | 24            8 | REPLY WHETHER SET-TOP IS NOMAL OR NOT   0x00: OK   0x01: Not OK |

FIG.9

| Syntax | NO. OF BITS |
|---|---|
| Diag_data_req() {          Diag_data_req_tag          Length_field( ) = 0 } | 24 |

FIG. 10A

| Syntax | NO. OF BITS | DESCRIPTION |
|---|---|---|
| Diag_data_cnf( ) { | | |
|    Diag_data_cnf_tag | 24 | |
|    Length_field() | - | |
|    Sub_system_number | 8 | NUMBER OF SUBSYSTEMS INCLUDED IN SET-TOP BOX |
|    For(I=0; I<Sub_system_number;1++) { | | |
|      Sub_system_id | 8 | |
|      Sub_system_status | 8 | REPLY WHETHER SET-TOP IS NOMAL OR NOT |
|    } | | |
| } | | |

FIG. 10B

| Sub_system | id VALUE(HEXA) | DESCRIPTION |
|---|---|---|
| CableNIM tuning sub_system | | |
| | 0x00 | OK |
| | 0x01 | In-band tuning not working |
| | 0x02 | OOB Rx tuning not working |
| | 0x03 | OOB Tx tuning not working |
| TP demultiplexing sub_system | ... | ... |
| ... | ... | ... |

OPEN CABLE SET-TOP BOX DIAGNOSING SYSTEM AND METHOD THEREOF

This application is a continuation of application Ser. No. 09/758,417, filed on Jan. 12, 2001, now U.S. Pat. No. 6,915,531, and for which priority is claimed under 35 U.S.C. § 120; and this application claims priority of Application No. 1569/2000 filed in Korea on Jan. 13, 2000 under 35 U.S.C. § 119; the entire contents of all are hereby incorporated by reference.

BACKGROUND OF THE INVENTION

1. Field of the Invention

The present invention relates to an open cable set-top box of which a point of deployment (POD) is separated from a main circuit unit, and more particularly to an open cable set-top box diagnosing system in which the POD, separated from a main circuit unit, has a newly defined interface that is used to check an operation state of an open cable set-top box, transmits the checked state to a predetermined server, according to which the operation state of the open cable set-top box is diagnosed, and a method thereof.

2. Description of the Background Art

Recently, a digital cable set-top box became popular. The set-top box is connected to a cable head end through a cable and produces a program for a digital cable. The digital cable set-top box makes a bidirectional communication with the cable head end in a manner that it receives an A/V broadcast program from the cable head end through an inband (IB), and transmits a user's request to the cable head end through an out of band (OOB) and receives a corresponding service to be displayed.

FIG. 1 is a schematic block diagram showing a construction of a conventional digital cable set-top box. As shown in the drawing, a digital cable set-top box 100 includes a tuner 11 for tuning a receive frequency to be able to receive an A/V broadcast program corresponding to a frequency of a channel desired by a user from a cable head end (not shown); a QAM (Quadrature Amplitude Modulation) demodulator 12 for receiving and demodulating an A/V broadcast program tuned by the tuner 11; a conditional access unit (CAU) 14 for receiving the demodulated signal from the QAM demodulator 12 according to a pre-set condition; a TP (transport) demultiplexer 16 for processing the signal outputted from the CAU 14 and outputting a data stream; an MPEG decoder 18-1 and an AC-3 decoder 18-2 for decoding the data stream outputted from the TP demultiplexer 16 and outputting video signals and audio signals; an OOB processing unit 13 for receiving the broadcast program information, such as a channel tuning or a program guidance from the tuner 11 through the OOB and processing it; and a CPU 17 for receiving the signal processed by the OOB processing unit 13 and controlling the CAU 14 and the TP demultiplexer 16.

The OOB processing unit 13 includes an OOB receiver 13-1 for receiving the signal outputted from the tuner 11; an OOB protocol processor 13-3 for processing a protocol of the signal processed by the OOB receiver 13-1 and outputting it to the CPU 17; and an OOB transmitter 13-2 for processing the signal outputted from the OOB protocol processor 13-3 and outputting it to the tuner 11.

The operation of the digital cable set-top box of the conventional art constructed as described above will now be explained.

When power is supplied to the digital cable set-top box, the tuner 11 receives an A/V broadcast program signal from the cable head end, tunes its frequency so as for a user to receive the A/V broadcast program, and outputs the tuned A/V broadcast program signal to the QAM demodulator 12. Then, the QAM demodulator 12 QAM-demodulates the A/V broadcast program signal and the QAM-demodulated signal to the CAU 14.

After the CAU 14 receives the QAM-demodulated signal, in case that the QAM-demodulated signal is in a scrambled state, the CAU 14 descrambles the QAM-demodulated signal according to a conditional access key (CAK) outputted from the CPU 17 and outputs it to the TP demultiplexer 16.

Then, the TP demultiplexer 16 separates a video packet and an audio packet of the descrambled signal and outputs them to the video decoder 18-1 and the audio decoder 18-2.

The video decoder 18-1 clears an overhead (i.e., various header information or starting code, etc.) from the video packet and performs variable-length decoding (VLD) for the pure data information. Then, the decoded information undergoes inverse-quantizing, inverse-discrete cosine transforming and motion compensating using a motion vector. The video-signal is restored as a pixel value of the original screen and outputted to the monitor.

The audio decoder 18-2 decodes the audio packet and outputs it to a speaker, by using an AC-3 algorithm.

Subscriber managing server systems connected with the cable head end manages subscribers connected with the cable head end, receives subscriptions from subscribers who desire to receive a paid program provided for a paid TV or a pay-per-view and transmits information corresponding to the paid program to the subscribers, and manages and operates the network on the whole.

When the subscriber registers at the subscriber managing server system, he or she is given a password from the subscriber managing server system. The paid program is provided from the head end to the set-top box as the subscriber inputs the password to the set-top box.

The subscriber managing server system renders the head end to transmit a diagnosis command signal to the set-top box 100, thereby diagnosing the operation state of the subscriber's set-top box. That is, when the OOB receiver of the set-top box receives the diagnosis command signal from the head end, the set-top box performs its own self-diagnosis program to diagnose whether there is an error in each circuit unit of the set-top box and transmits the diagnosis result to the head end through the OOB transmitter.

Upon receipt of the diagnosis result of the set-top box, the head end transmits the diagnosis result to the subscriber managing server system and receives an instruction from the subscriber managing server system as necessary.

Since the communication standard is already set, the set-top box is manufactured by a set-top box manufacturers in cooperation with a cable system operator (SO). Accordingly, the cable SOs install the set-top box only for the subscribers who order it. Thus, problems arise that it is difficult to control production of the set-top box, there is a problem of an inventory burden, and the set-top box is to be replaced whenever the function of the set-top box is upgraded.

In order to solve the problems, the cable SOs set a standard, such as an 'open cable', for separating the CAU from the main circuit unit and manufactures a set-top box without the CAU.

In detail, the open cable set-top box of the above description is manufactured in a manner that the point of deployment (POD) including the CAU that has been installed in the cable set-top box is separated from the main circuit unit of the set-top box. A standard interface protocol between the main circuit unit of the set-top box and the POD is defined, and an interface is included between the main circuit unit and the POD.

Accordingly, the set-top box manufacturer can manufacture the open cable set-top box without a restriction, and users also can purchase the open cable set-top box without a restriction.

Accordingly, the users may purchase the open cable set-top box and the POD provided by the cable SOs and connect them, thereby viewing cable broadcasting.

FIG. 2 is a schematic block diagram showing a construction of an open cable set-top box in accordance with the conventional art, which includes a main circuit unit 200, a point of deployment (POD) module 300 and an interface 201 for connecting the main circuit unit 200 and the POD module 300.

The main circuit unit 200 includes a tuner 21 for tuning a receive frequency to be able to receive an A/V broadcast program corresponding to a frequency of a channel desired by a user from a cable head end (not shown); a QAM (Quadrature Amplitude Modulation) demodulator 22 for receiving an A/V broadcast program tuned by the tuner 11, demodulating it and outputting the demodulated QAM signal through the interface 201 to the POD module 300; a TP (transport) demultiplexer 24 for processing the signal received through the interface 201 from the POD module 300 and outputting a data stream; an MPEG decoder 26-1 and an AC-3 decoder 26-2 for decoding the data stream outputted from the TP demultiplexer 24 and outputting video signals and audio signals; an OOB receiver 23-1 for receiving the broadcast program information such as a channel tuning or a program guidance from the tuner 21 through the OOB, processing and outputting it through the interface 201 to the POD module 300; an OOB transmitter 23-2 for receiving the signal through the interface 201 from the POD module 300 and outputting it through the OOB to the tuner 21; and a CPU 25 for controlling each circuit unit of the main circuit unit 200 and communicating with the POD module 300 through the interface 201.

The POD 300 includes a local CPU 34 for communicating with the CPU 25 of the main circuit unit 200 and controlling the whole POD; a CAU 33 for receiving the demodulated QAM from the QAM demodulator 22 of the main circuit unit 200, and descrambling the QAM-demodulated signal according to a conditional access key (CAK) outputted from the CPU 34 and outputting it to the TP demultiplexer 24 in case that the QAM-demodulated signal is in a scrambled state; an OOB protocol processor 31 for communicating with the OOB receiver 23-1 and the OOB transmitter 23-2 under the control of the CPU 34; and a TP demultiplexer 32 for receiving the demodulated QAM and the signal from the OOB protocol processor 31 and demultiplexing them.

The POD module 300 shown in FIG. 2 is in the form of a PCMCIA card.

The operation of the conventional open cable set-top box constructed as described above will now be explained.

When power is supplied to the open cable set-top box, an A/V broadcast program is inputted to the POD module 300 through the tuner 21 and the QAM demodulator 22, and the CAU 33 of the POD module 300 descrambles and outputs the A/V program to the TP demultiplexer 24 of the main circuit unit 200. In other words, the CPU 34 of the POD module 300 interprets the command received from the head end through the OOB transmitter 23-2 and OOB receiver 23-1 of the main circuit unit 200 and the OOB protocol processor 31 and the TP demultiplexer 32 of the POD module 300 and outputs the interpreted command through a data channel and an extended channel of the interface 201 to the CPU 25 of the main circuit unit 200, so that the CPU 25 performs the command instructed by the head end.

Alternatively, the CPU 34 of the POD module 300 transmits a request of a user through the OOB transmitter 23-2 and the OOB receiver 23-1 of the main circuit unit 200 and the OOB protocol processor 31 and the TP demultiplexer 32 of the POD module 300 to the head end, so that the user may receive his or her desired program.

FIG. 3 shows a communication protocol between the CPU of the POD and the CPU of the main circuit unit transmitted via the data channel. As shown in the drawing, the communication protocol includes, from the bottom, a PC card physical layer, a PC card link layer, a PC card transport sublayer, a generic transport sublayer and a session layer, which are common with other communication protocol, and a resource layer which has different contents. The resource layer gives and takes a software module such as an object to and from other layers to support execution of applications arranged at the upper portion of the resource layer.

The application performs the communication between the POD module 300 and the main circuit unit, 200 using resources included in the resource layer. Thus, whether the function of the POD interface can be extended is determined depending on how the resources are defined.

For example, the below Table 1 shows kinds of resources defined in the current U.S. open cable standard.

TABLE 1

| Resource | DVS064 Part B | Open Cable |
|---|---|---|
| Resource Manager | Yes | Yes |
| MMI | Yes | Yes |
| Application information | Yes | Updated |
| Low Speed Communication | Yes | Updated |
| Conditional Access Support | Yes | Yes |
| Smart Cart Reader | Optional | Optional |
| Copy Protection | No | Yes |
| Host Control-info. Resource | Yes | Updated |
| Extended Channel Support | No | Yes |
| Generic IPPV Support | No | Yes |
| Specific Application Support | No | Yes |

As shown in Table 1, the resources are defined only to support applications used by users without including any resources to diagnose a defective state or a defective condition of the set-top box.

Thus, because the open cable set-top box being on the market does not include such a resource having a diagnostic function in the POD interface, it is not possible for the POD module 300 to diagnose itself or the main circuit unit 200 to determine whether or not the set-top box is out of order.

In addition, in case that the open cable set-top box is out of order and thus the user is not able to view a desired broadcast program, since the user has no idea of which one of the POD module and the main circuit unit of the set-top box has been rendered inoperable the user cannot determine whether to report he problem to one of the cable SO or the set-top box manufacturer.

Therefore, since the head end, which provides the service to the open cable set-top box, is unable to recognize the disorder of the subscriber set-top box in advance, its competitive edge is degraded with respect to the satellite broadcast producers and ground wave broadcast producers.

SUMMARY OF THE INVENTION

Therefore, an object of the present invention is to provide an open cable set-top box diagnosing system in which a diagnosis resource for checking an operation state of a set-top box is added to resources defined for POD interfacing so that a cable head end can diagnose the operation state of a set-top box through a POD, and its method.

Another object of the present invention is to provide an open cable set-top box diagnosing system in which, when a set-top box gets out of order, diagnosis information on the defective set-top box is transmitted to a set-top box manufacturer on a real time basis through a network, so that the troubled set-top box can be easily settled, and its method.

To achieve these and other advantages and in accordance with the purpose of the present invention, as embodied and broadly described herein, there is provided an open cable set-top box diagnosing system in which a cable head end checks an operation state of a set-top box through a point of deployment (POD) by using a diagnosis resource for checking an operation state of the set-top box of a resource layer defined for interface between the point of deployment and the set-top box in an open cable set-top box of which the POD and the set-top box are separated, and the cable head end is connected with a manufacturer of the set-top box by bidirectional network.

To achieve the above objects, there is also provided an open cable set-top box diagnosing system including an open cable set-top box 400B for checking its own operation state by using a diagnosis resource by a communication protocol between a point of deployment (POD) separated from the main circuit unit and the main circuit, and a head end 400A for providing a service corresponding to a request signal received from the open cable set-top box 400B or providing a broadcast program to the open cable set-top box, and checking the operation state of the open cable set-top box.

To achieve the above objects, there is also provided an open cable set-top box diagnosing method including a step in which when a command for checking the operation state of the set-top box is inputted from the head end, the point of deployment (POD) requests system state information from the set-top box, and when the system state information is received from the set-top box, the POD transmits it to the head end; a step in which the head end checks whether there is an error in the set-top box on the basis of the received system state information and requests detailed information on a defective sub-system from the POD in case that there is an error in the set-top box; and a step in which the POD requests detailed information of the defective sub-system from the set-top box, and when detailed information on the defective sub-system is received from the set-top box, the POD transmits the detailed information to the head end.

To achieve the above objects, there is also provided an open cable set-top box diagnosing method including the steps of: requesting state information on the open cable set-top box according to the command for checking the operation state of the open cable set-top box received from the head end; diagnosing whether there is an error in the open cable set-top box on the basis of the state information; and requesting detailed information on circuit units of a defective open cable set-top box in case that there is an error in the open cable set-top box.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 5 shows an example of coding of a Diag_open_req( ) object;

FIG. 6A shows an example of coding of Diag_open_cnf( ) object;

FIGS. 6B and 6C show Datatype_id value, length and Sub-system_id previously defined in the Diag_open_cnf( ) object;

FIG. 7 shows an example of coding of a Diag_sta_req( ) object;

FIG. 8 shows an example of coding of a Diag_stat_cnf( ) object;

FIG. 9 shows an example of coding of a Diag_stat_req( ) object;

FIG. 10A shows an example of coding of a Diag_data_cnf( ) object;

FIG. 10B shows an example of coding of a Diag_data_cnf( ) object; and

DETAILED DESCRIPTION OF THE PREFERRED EMBODIMENTS

Reference will now be made in detail to the preferred embodiments of the present invention, examples of which are illustrated in the accompanying drawings.

Figure 4:
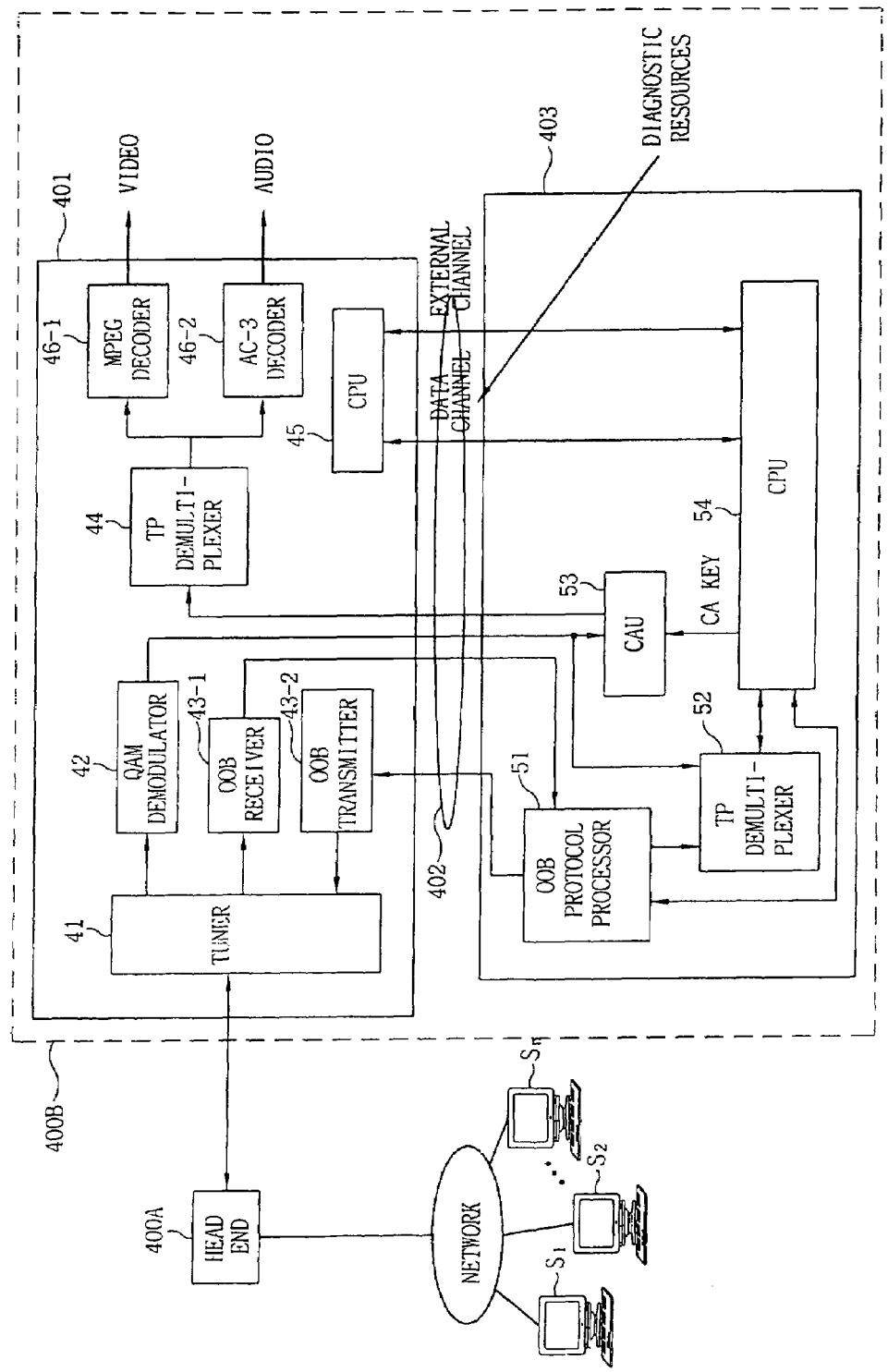
FIG. 4 is a schematic block diagram showing a construction of an open cable set-top box diagnosing system in accordance with the present invention.

FIG. 4 is a schematic block diagram showing a construction of an open cable set-top box diagnosing system in accordance with the preferred embodiment of the present invention.

As shown in the drawing, the open cable set-top box diagnostic system of the present invention is operable with a head end 400A for providing a broadcast program, subscriber managing servers (S1, S2, . . . , Sn) connected with the head end 400A and an open cable set-top box 400B according to the preferred embodiment of the present invention connected with the head end 400A.

The open cable set-top box 400B includes a main circuit unit 401, CPU 45, a point of deployment (POD) 403 and an interface 402 for connecting the main circuit unit 401 and the POD 403.

The main circuit unit 401 includes a tuner 41 for tuning a received frequency to receive an A/V broadcast program corresponding to a frequency of a channel desired by a user from a cable head end 400A; a QAM (Quadrature Amplitude Modulation) demodulator 42 for receiving an A/V broadcast program tuned by the tuner 41, demodulating it and outputting the demodulated QAM signal through the interface 402 to the POD 403; a TP (transport) demultiplexer 44 for processing the signal received through the interface 402 from the POD 403 and outputting a data stream; an MPEG decoder 46-1 and an AC-3 decoder 46-2 for decoding the data stream outputted from the TP demultiplexer 44 and outputting video signals and audio signals; an OOB receiver 43-1 for receiving the broadcast program information, such as a channel tuning or a program guidance from the tuner 41 through the OOB, processing and outputting it through the interface 402 to the POD 403; an OOB transmitter 43-2 for receiving the signal through the interface 402 from the POD 403 and outputting it through the OOB to the tuner 41; and a CPU 45 for controlling each circuit unit of the main circuit unit 401 and communicating with the POD 403 through the interface.

According to the preferred embodiment, the POD 403 includes a CPU 54 for communicating with the CPU 45 of the main circuit unit 401 and controlling the whole POD; a CAU 53 for receiving the demodulated QAM from the QAM demodulator 42 of the main circuit unit 401, and descrambling the QAM-demodulated signal according to a conditional access key (CAK) outputted from the CPU 54 and outputting it to the TP demultiplexer 44 in case that the QAM-demodulated signal is in a scrambled state; an OOB protocol processor 51 for communicating with the OOB receiver 43-1 and the OOB transmitter 43-2 under the control of the CPU 54; and a TP demultiplexer 52 for receiving the demodulated QAM and the signal from the OOB protocol processor 51 and demultiplexing them.

Preferably, the POD described above may be in a form of a PCMCIA card or other suitable interface, wherein a communication module of the PCMCIA card type is connected to the POD interface port.

The operation of the open cable set-top box of the present invention constructed as described above will now be explained.

When power is supplied to the open cable set-top box 400B, an A/V broadcast program is inputted to the POD 403 through the tuner 41 and the QAM demodulator 42, and the CAU 53 of the POD 403 descrambles and outputs the A/V program to the TP demultiplexer 44 of the main circuit unit 401. In other words, the CPU 54 of the POD 403 interprets the command received from the head end through the OOB transmitter and OOB receiver of the main circuit unit 401 and the OOB protocol processor 51 and the TP demultiplexer 52 of the POD 403 and outputs the interpreted command through a data channel and an extended channel of the interface 402 to the CPU 45 of the main circuit unit 401, so that the CPU 45 performs the command instructed by the head end 400A.

Alternatively, the CPU 54 of the POD 403 transmits a request of a user through the OOB transmitter 43-2 and the OOB receiver 43-1 of the main circuit unit 401 and the OOB protocol processor and the TP demultiplexer 52 of the POD 403 to the head end 400A, so that the user may receive the desired program.

Figure 1:
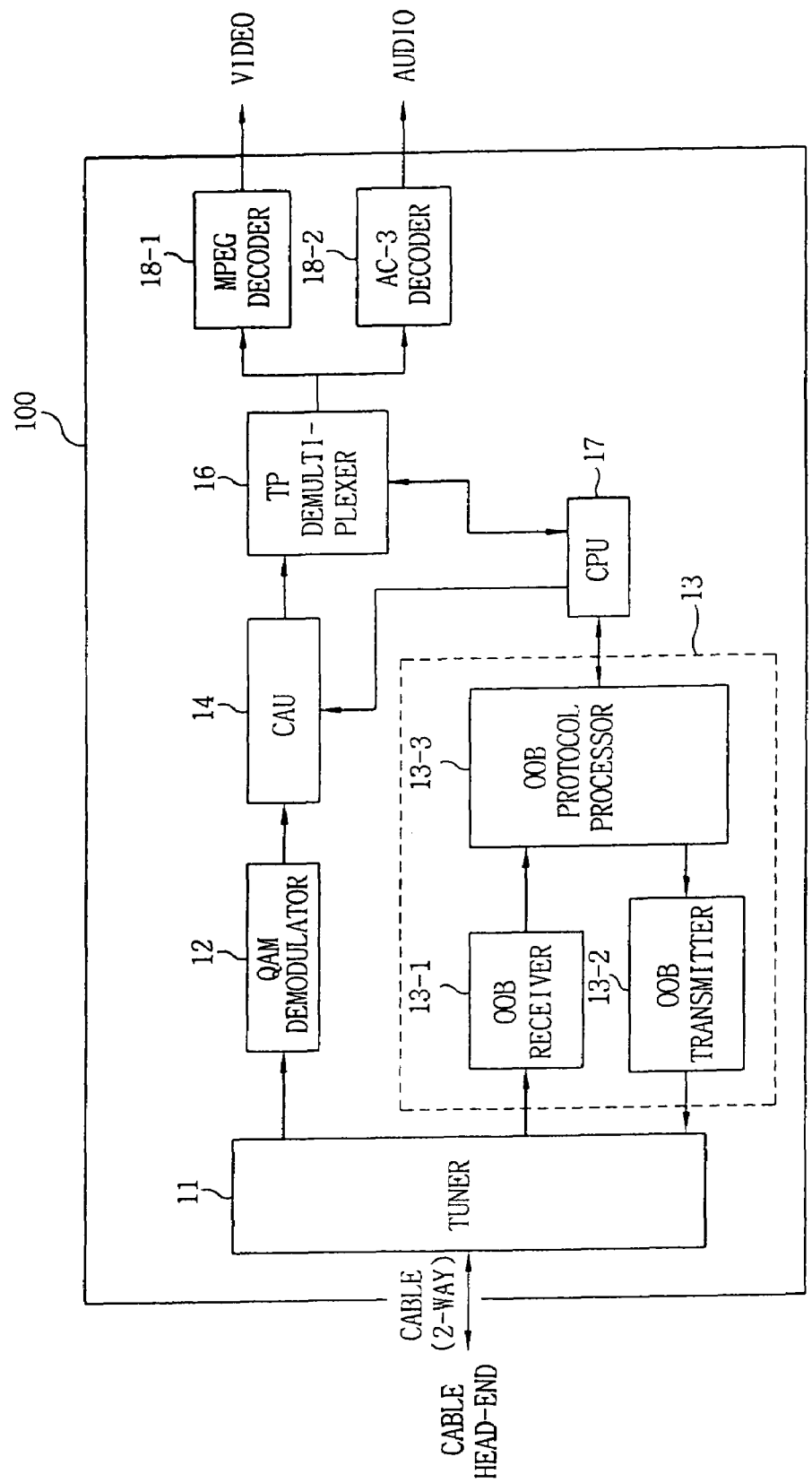
FIG. 1 is a schematic block diagram showing a construction of a general digital cable set-top box.
Figure 2:
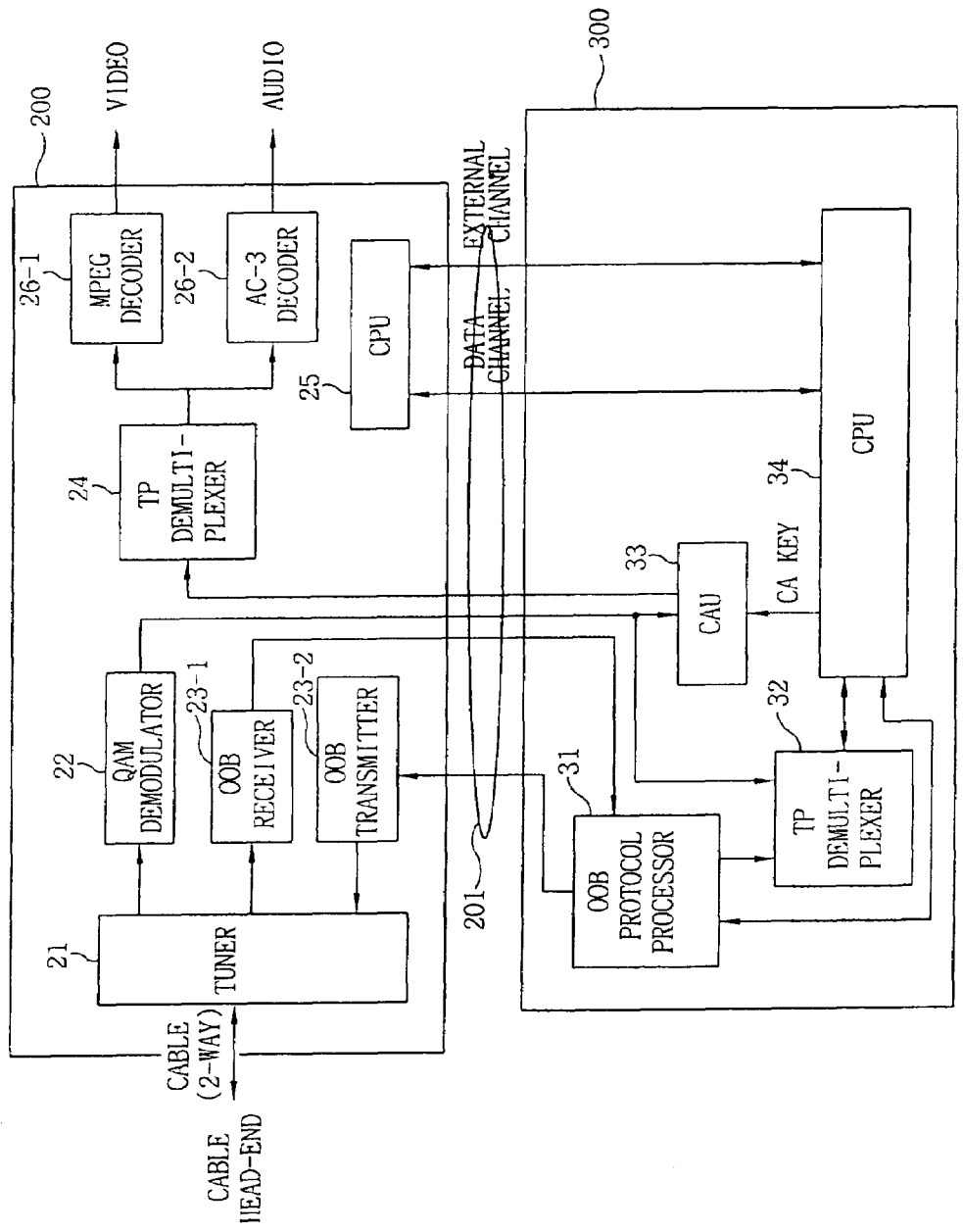
FIG. 2 is a schematic block diagram showing a construction of an open cable set-top box in accordance with a conventional art.
Figure 3:
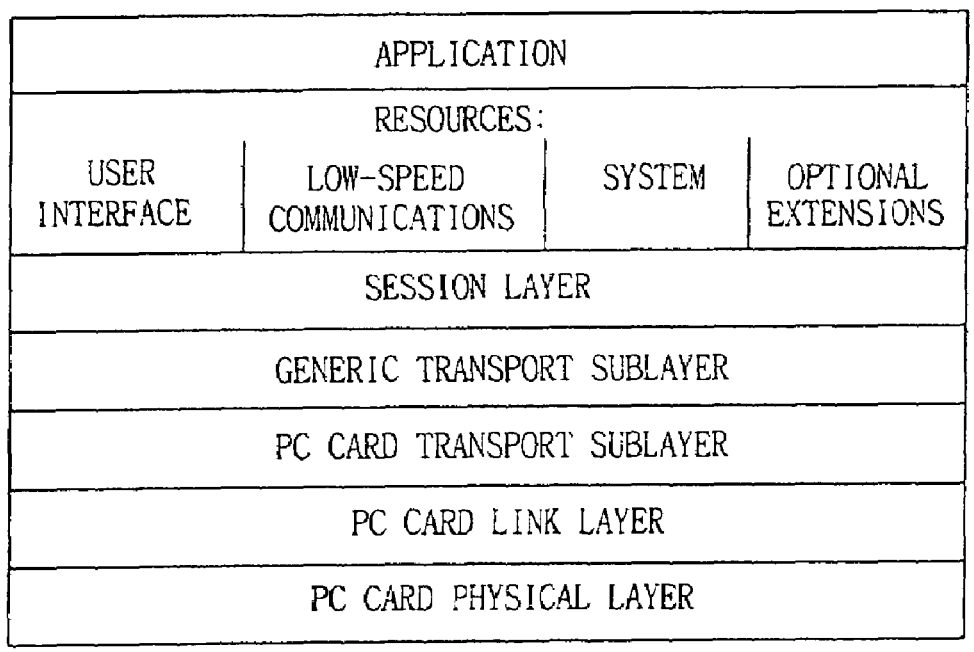
FIG. 3 illustrates a communication protocol between a POD and a main circuit unit in accordance with the conventional art.

As described earlier, FIG. 3 illustrates the communication protocol between the CPU 54 of the POD 403 and the CPU 45 of the main circuit unit 401 transmitted via the data channel of a conventional open cable set-top box, and includes, from the bottom, a PC card physical layer, a PC card link layer, a PC card transport sublayer, a generic transport sublayer and a session layer, and a resource layer.

In contrast to the conventional devices, the resource layer of the present invention also includes a resource for diagnosing the operation state of the set-top box, so that the set-top box can diagnose its own operation state. Also, the resource layer contains a resource manager resource, an MMI resource, an application information resource, a low speed communication resource, a conditional access support resource, a copy protection resource, a host control information resource, an extended channel support resource, a generic IPPV support resource, a specific application support resource and a diagnostic resource. Wherein the diagnostic resource of the POD includes at least one diagnostic state request object and a diagnostic state confirmation object. The diagnostic state request object performs a diagnosing of a system and the diagnostic state confirmation object transfers the system state, or diagnosis result to the head end 400A or the broadcasting station.

In addition, the diagnostic resource contains a diagnostic open request object, a diagnostic open confirmation object, a diagnostic state request object, a diagnostic state confirmation object, a diagnostic data request object, and a diagnostic data confirmation request. The diagnostic state confirmation object transfers the diagnosis result to the head end 400 A or to the broadcasting station.

In other words, by adding a diagnosis resource for checking the operation state of the set-top box to the resources defined for the POD interface, the cable head end is able to check the operation state of the set-top box through the POD module, so that the cable SOs can manage and administer the subscriber set-top box, and can recognize a necessary remedial step in advance and quickly fix the problem.

Accordingly, in case that the set-top box has an error, the cable head end 400A informs a corresponding set-top box manufacturer of the error information on the defective set-top box on a substantially real time basis through a network, so that it can be repaired or replaced rapidly. That is, the head end periodically checks an operation state of the set-top box and informs a pertinent set-top box manufacturer of diagnosed information on the set-top box with a problem through the network on the real time basis.

The diagnosis resource of the present invention which is added to the conventional resource layer of the POD interface is described in detail.

The diagnosis resource preferably includes defined objects to exchange diagnosis data between the POD 403 and the main circuit unit 401. The objects a) determine a specific ID information data format to discriminate subscriber set-top box, such as a manufacturer name, a model name or a serial number, b) divide the whole system to sub-systems, c) identify a functional unit to be checked, d) assign an ID, and e) define states of each sub-system. That is, the diagnostic resource a) defines a priori an object that the POD interface module and the set-top box are to use for exchanging the diagnosis data, b) determines a specific ID information data format for identifying the subscriber set-top box, c) divides the whole system into sub-systems, d) identifies the functional unit to be checked, e) assigns the ID to each sub-system, f) defines each state of the sub-systems and g) exchanges status information of each sub system as a data of the object.

For example, the objects belonging to the diagnosis resource of the present invention are as follows.

Diag_open_req( ) POD→set-top box: requesting to open diagnosis source

Diag_open_cnf( ) POD←set-top box: replying for subsystem construction information of the set-top box Diag_state_req( ) POD→set-top box: requesting a system state Diag_state_cnf( ) POD←set-top box: replying whether there is an error in the system Diag_data_req( ) POD→set-top box: requesting detailed information in case that there is an error in the system Diag_data_cnf( ) POD←set-top box: replying to identify the defective sub-system state.

FIGS. 5 through 10 illustrate examples of codings to implement the objectives describe above.

FIG. 5 shows an example of coding of a Diag_open_req( ) object; FIG. 6A shows an example of coding of Diag_open_cnf( ) object; FIGS. 6B and 6C show Datatype_id value, length and Sub-system_id previously defined in the Diag_open_cnf( ) object; FIG. 7 shows an example of coding of a Diag_sta_req( ) object; FIG. 8 shows an example of coding of a Diag_stat_cnf( ) object; FIG. 9 shows an example of coding of a Diag_stat_req( ) object; FIG. 10A shows an example of coding of a Diag_data_cnf( ) object; and FIG. 10B shows an example of coding of a Diag_data_cnf( ) object.

Figure 11:
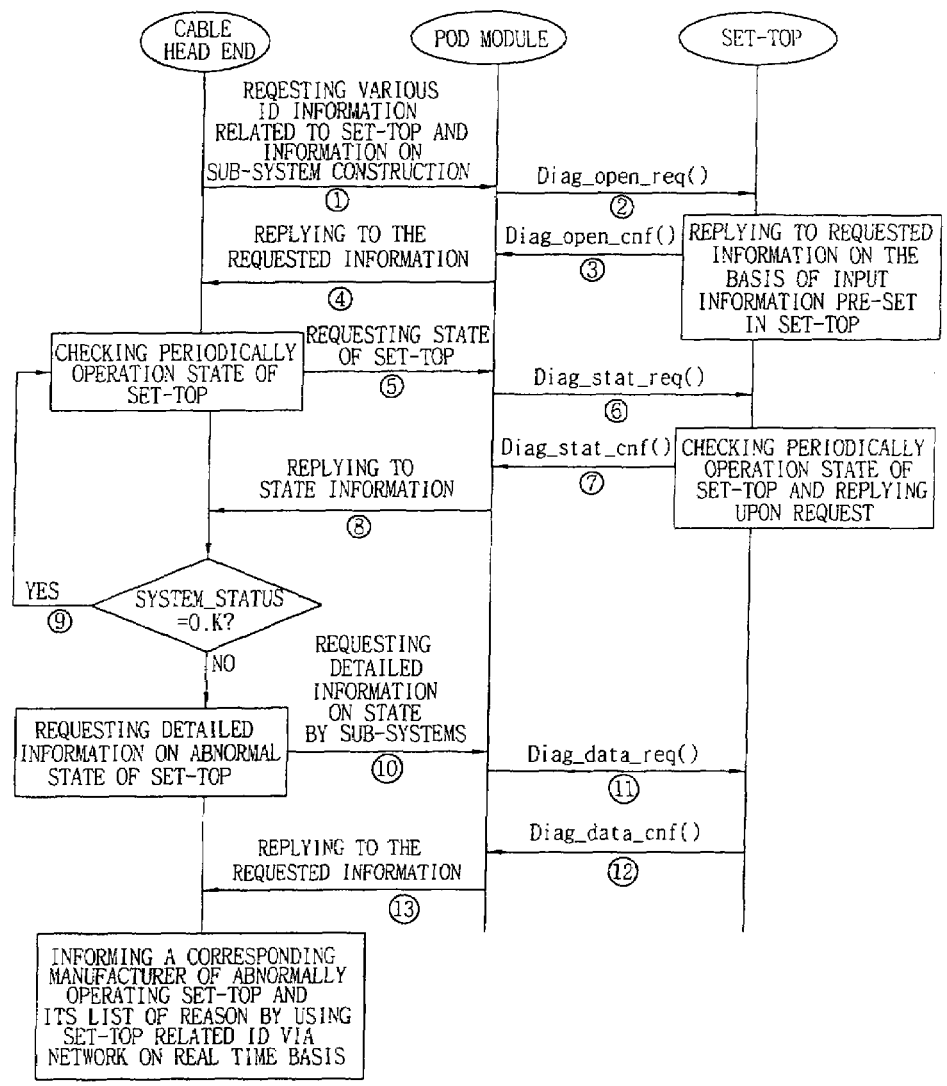
FIG. 11 is a flow chart of a method for diagnosing operation state of the open cable set-top box in accordance with the present invention.

FIG. 11 is a flow chart of a method for diagnosing operation state of the open cable set-top box in accordance with the present invention.

With reference to FIG. 11, after the OOB transmitter 43-2 and receiver 43-1 of the main circuit unit 401 connected with the head end 400A interpret the command received from the head end, the CPU 54 of the POD 403 renders the OOB transmitter 43-2 and receiver 43-1 to communicate with the CPU 45 of the main circuit unit 401 through the data channel of the extended channel through the interface 402 to perform the command instructed by the head end, or transmits contents inputted by the user and the state information of each circuit unit of the set-top box through the OOB transmitter and receiver of the main circuit unit 401 connected with the head end.

When the cable head end 400A requests various ID information related to the set-top box and the information on the sub-system or component construction from the POD (step 1), the POD requests the main circuit unit of the set-top box to open the diagnosis resource by using the Diag_open_req( ) object as shown in FIG. 5 (step 2).

Then, the main circuit unit transmits the information requested by the POD obtained on the basis of the pre-set input information by using the Diag_open_cnf( ) object as shown in FIG. 6 (step 3).

Accordingly, the POD transmits the various ID information related to the set-top box and information on the sub-system construction to the cable head end (step 4).

Thereafter, when the cable head end transmits the command for periodically checking and reporting the operation state of the set-top box to the POD (step 5), the POD checks the operation state of the set-top box through the diagnosis resource defined in the POD interface and reports it to the cable head end.

That is, the POD requests the system state from the set-top box by using the Diag_stat_req( ) object as shown in FIG. 7 (step 6), the main circuit unit of the set-top box, which has periodically checked the operation state of the set-top box, transmits the system state of the set-top box to the POD by using the Diag_stat_cnf( ) object as shown in FIG. 8 (step 7).

Then, the POD transmits the system state of the set-top box to the cable head end (step 8), and the cable head end checks whether there is an error in the system on the basis of the received information (step 9).

In case that there is no error in the system of the set-top box, the cable head end repeatedly checks the operation state of the set-top box (steps 5, 6, 7, 8 and 9), while, in case that there is an error in the system, the cable head end requests detailed state information on the defective sub-system from the POD (step 10).

Then, the POD requests detailed information on the sub-system of the defective set-top box from the main circuit unit of the set-top box by using the Diag_data_req( ) object as shown in FIG. 9 (step 11).

Then, the main circuit unit of the set-top box transmits the state information of the sub-system of the defective set-top box to the POD by using the Diag_data_cnf( ) object as shown in FIG. 10 (step 12), and the POD transmits the received state information of the sub-system of the set-top box to the cable head end (step 13).

While the head end is checking the operation state of the set-top box, in case that the head end is informed of the defective set-top box from the POD, the head end registers the informed content with the subscriber managing servers (S1, S2, . . . , Sn) and informs the corresponding manufacturer of the defective set-top box of the ID of the defective set-top box and the abnormal operation state content on the real time basis.

Accordingly, various service (i.e., early report on a trouble, repairing or replacing, etc) for the troubled set-top box can be effectively and quickly provided by the manufacturers.

In addition, the cable head end is able to detect the trouble of the POD as it occurs and the cable head end reports the error to an A/S service person of the cable head end itself, so that its own A/S service person can expeditiously settle the problem.

As described, in the open cable set-top box diagnosing system and method according to the preferred embodiment of the present invention, the interface for diagnosing the set-top box function is added to the POD interface of the digital cable set-top for an open cable, so that the cable head end can manage the ID information to discriminate set-top boxes owned by each subscriber and the operation state information of each set-top box on the real time basis.

In addition, in case that the set-top box or the POD is improperly operating the diagnosis information on the troubled set-top box may be transmitted to the corresponding set-top box manufacturer, so that the troubled set-top box or the POD can be quickly repaired or replaced.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A host device for interfacing with a point of deployment (POD) module in an open cable diagnosing system, the host device comprising:
   a plurality of sub-systems configured to receive a descrambled broadcasting signal from the POD module, and to decode the descrambled signal; and
   a microprocessor configured to control operations of the plurality of sub-systems,
   wherein the microprocessor is configured to perform a specific set of diagnostic functions upon receiving a diagnostic request object from the POD module, and to transmit a diagnostic confirmation object back to the POD module in accordance with a diagnostic resource, wherein the diagnostic resource defines at least one diagnostic request object and at least one diagnostic confirmation object,
   wherein the diagnostic resource defines the diagnostic request object and the diagnostic confirmation object,
   wherein the diagnostic request object includes a plurality of identifiers, each identifier being assigned to one of plural functional units in the host device to be checked for a corresponding diagnostic status, and
   wherein the diagnostic confirmation object includes state information about each of the functional units.

2. The host device of claim 1, wherein the microprocessor is configured to exchange the diagnostic request object and the at least one diagnostic confirmation object with the POD module.

3. The host device of claim 1, wherein the diagnostic confirmation object includes an identification (ID) and an operation status for at least one of the plurality of sub-systems.

4. The host device of claim 1, wherein the diagnostic confirmation object includes specific information or an operation status of at least one of the plurality of sub-systems.

5. The host device of claim 1, wherein the diagnostic confirmation object includes each of the identifiers assigned to each of the functional units, and a diagnostic status corresponding to each of the identifiers.

6. The host device of claim 1, wherein the diagnostic request object is received from the POD module through a central processing unit (CPU) interface,
- wherein the CPU interface defines a data channel between a CPU of the POD module and a CPU of the host device, and
- wherein the diagnostic confirmation object is exchanged between the host device and the POD module through the data channel.

* * * * *